(12) United States Patent
Li et al.

(10) Patent No.: US 12,466,751 B2
(45) Date of Patent: Nov. 11, 2025

(54) INTELLIGENT LOW-CARBON TREATMENT AND REUSE SYSTEM FOR STORMWATER AND WASTEWATER

(71) Applicant: Beijing University of Civil Engineering and Architecture, Beijing (CN)

(72) Inventors: Haiyan Li, Beijing (CN); Yuqi Pan, Beijing (CN); Yu Cheng, Beijing (CN); Zhaoying Liu, Beijing (CN); Yulin Li, Beijing (CN); Chaohong Tan, Beijing (CN); Jiayuan Xu, Beijing (CN); Zhengxing Liu, Beijing (CN)

(73) Assignee: Beijing University of Civil Engineering and Architecture, Beijing (CN)

( * ) Notice: Subject to any disclaimer, the term of this patent is extended or adjusted under 35 U.S.C. 154(b) by 0 days.

(21) Appl. No.: 19/258,875

(22) Filed: Jul. 2, 2025

(65) Prior Publication Data
US 2025/0333343 A1    Oct. 30, 2025

(30) Foreign Application Priority Data
Oct. 9, 2024  (CN) .......................... 202411398988.1

(51) Int. Cl.
*C02F 3/32*   (2023.01)
*C02F 1/00*   (2023.01)
(Continued)

(52) U.S. Cl.
CPC .............. *C02F 3/327* (2013.01); *C02F 1/006* (2013.01); *C02F 3/006* (2013.01); *C02F 3/302* (2013.01);
(Continued)

(58) Field of Classification Search
CPC .......... C02F 3/327; C02F 1/006; C02F 3/006; C02F 3/302; C02F 2209/04; C02F 2209/06; E03F 5/14; E03F 5/10
(Continued)

(56) References Cited

FOREIGN PATENT DOCUMENTS

| CN | 106186297 A | 12/2016 |
|---|---|---|
| CN | 107746156 A | 3/2018 |

(Continued)

OTHER PUBLICATIONS

Huang et al, CN 111995166 English machine translation, pp. 1-9 (Year: 2020).*

(Continued)

*Primary Examiner* — Claire A Norris
(74) *Attorney, Agent, or Firm* — Addison D. Ault; IPGentleman Intellectual Property Services, LLC

(57) ABSTRACT

The present disclosure provides an intelligent low-carbon treatment and reuse system for stormwater and wastewater, including: a bioretention module for collecting stormwater and treating it to obtain treated stormwater; a numerically controlled drainage module for collecting oxidation-reduction potential data and pH data of the treated stormwater and transmitting them to a control module as environmental data, and discharging treated stormwater for a preset time period based on a first control signal sent by the control module; a stormwater and wastewater collection module for storing the discharged treated stormwater and maintaining water storage volume within a preset range; an irrigation module; and the control module. Stable, efficient and low-carbon treatment and reuse of stormwater and wastewater are achieved.

8 Claims, 5 Drawing Sheets

(51) Int. Cl.
  *C02F 3/00* (2023.01)
  *C02F 3/30* (2023.01)
  *C02F 101/16* (2006.01)
  *C02F 101/20* (2006.01)
  *C02F 103/00* (2006.01)
  *E03F 5/14* (2006.01)
  *G01N 33/18* (2006.01)

(52) U.S. Cl.
  CPC ............... *E03F 5/14* (2013.01); *G01N 33/18* (2013.01); *C02F 2101/16* (2013.01); *C02F 2101/20* (2013.01); *C02F 2103/001* (2013.01); *C02F 2201/005* (2013.01); *C02F 2201/009* (2013.01); *C02F 2209/003* (2013.01); *C02F 2209/04* (2013.01); *C02F 2209/06* (2013.01); *C02F 2209/42* (2013.01); *C02F 2209/44* (2013.01); *C02F 2305/06* (2013.01)

(58) Field of Classification Search
  USPC .......................... 210/103, 104, 290, 170.03
  See application file for complete search history.

(56) References Cited

FOREIGN PATENT DOCUMENTS

| | | | |
|---|---|---|---|
| CN | 209907525 U | 1/2020 | |
| CN | 111995166 A | * 11/2020 | ................ E03F 5/14 |

OTHER PUBLICATIONS

Chinese Patent No. CN 209907525 U, to Hongjie Wang, Issued Jan. 7, 2020, English translation, pp. 1-7.
Chinese Patent No. CN 107746156 A, to Weibing Zhang, Issued Mar. 2, 2018, English translation, pp. 1-12.
Chinese Patent No. CN 106186297 A, to Nan Hua, Issued Dec. 7, 2016, English translation, pp. 1-8.
CNIPA First Office Action, Application No. 202411398988.1, dated Jan. 23, 2025 , original Chinese, pp. 1-6.
CNIPA First Office Action, Application No. 202411398988.1, dated Jan. 23, 2025 , English translation, pp. 1-7.

* cited by examiner

INTELLIGENT LOW-CARBON TREATMENT AND REUSE SYSTEM FOR STORMWATER AND WASTEWATER

CROSS-REFERENCE TO RELATED APPLICATION

This application claims priority to Chinese Patent Application No. 202411398988.1, filed on Oct. 9, 2024, titled "Intelligent Low-Carbon Treatment and Reuse System for Stormwater and Wastewater" before the China National Intellectual Property Administration, the disclosure of which is incorporated herein by reference in entirety.

TECHNICAL FIELD

The present disclosure relates to the field of stormwater and wastewater treatment, and in particular to an intelligent low-carbon treatment and reuse system for stormwater and wastewater.

BACKGROUND

At present, the accelerated urbanization process has led to the aggravation of water pollution problems, and nitrogen pollution in surface runoff is serious. As a key green infrastructure, the bioretention system has been widely adopted and constructed, and it has a good removal effect on pollutants such as nitrogen and phosphorus in runoff. In order to ensure efficient removal of nitrogen, existing technologies have improved traditional bioretention systems, including the measures such as adding electron donors and adding submerged zones (saturated zones). The setting of the submerged zone is to establish anoxic conditions, expand the area of the reaction zone, and allow stormwater to stay for a period of time to ensure that the reaction occurs fully to enhance the stormwater treatment effect.

As the retention time of stormwater increases, greenhouse gas emissions increase accordingly. Excessive retention of stormwater in the collection module will lead to a significant increase in radiative forcing caused by greenhouse gas emissions, thus affecting the balance between denitrification (nitrogen removal) and carbon reduction. However, if the stormwater is discharged too early, the existing system will generally face the problems of limited plant growth and damaged microbial activity after the stormwater is discharged, which will greatly affect the denitrification performance of the system during the next rainfall. Therefore, a more flexible management strategy is needed to meet this challenge.

Therefore, how to reduce the impact of greenhouse gas emissions accompanying the system treatment process on the ecology while ensuring stable and efficient treatment of stormwater nitrogen pollution is an urgent problem that the persons skilled in the art need to solve.

SUMMARY

In view of this, the present disclosure provides an intelligent low-carbon treatment and reuse system for stormwater and wastewater (sewage), which achieves stable and efficient stormwater treatment while reducing the impact of greenhouse gas emissions accompanying the system treatment process.

In order to achieve the above object, the present disclosure adopts the following technical solutions:

An intelligent low-carbon treatment and reuse system for stormwater and wastewater, comprising: a bioretention module, a numerically controlled drainage module, a stormwater and wastewater collection module, an irrigation module and a control module;

the bioretention module is configured to collect stormwater, improve species of bacterial flora, and treat the stormwater to obtain treated stormwater;

the numerically controlled drainage module is configured to collect oxidation-reduction potential data and pH data of the treated stormwater and transmit them to the control module as environmental data, and discharge the treated stormwater for a preset time period based on a first control signal sent by the control module;

the stormwater and wastewater collection module is configured to store the discharged treated stormwater and maintain water storage volume within a preset range;

the irrigation module is configured to collect soil moisture data of the bioretention module and transmit it to the control module, and extract the stored water in the stormwater and wastewater collection module to irrigate the bioretention module based on a second control signal sent by the control module;

the control module is configured to receive the environmental data and perform a dual-condition judgment, send the first control signal when a preset condition is met, receive the soil moisture data, and send the second control signal when a set condition is met.

According to some embodiments of the present disclosure, the bioretention module comprises: a planting layer, a filler media layer, a drainage layer and a drainage pipe;

the planting layer is configured to collect and filter stormwater, slow down a speed of stormwater runoff, and perform nitrification reaction;

the filler media layer has a predetermined amount of plant-based carbon source therein, the filler media layer is configured to provide a carbon source for microorganisms, improve the species of bacterial flora, and perform a denitrification reaction on stormwater to obtain the treated stormwater;

the drainage layer is configured to support the planting layer and the filler media layer and facilitate the drainage of the treated stormwater to a pipeline;

the drainage pipe is in communication with the drainage layer and is configured for the drainage of the treated stormwater.

According to some embodiments of the present disclosure, the bioretention module further comprises an outlet pipe;

the outlet pipe is in communication with the drainage pipe and is configured for discharging excess stormwater when the amount of stormwater is greater than a set value.

According to some embodiments of the present disclosure, the numerically controlled drainage module comprises: an ORP electrode, an ORP monitor, a pH electrode, a pH monitor and an electric ball valve;

the ORP electrode is configured to collect the oxidation-reduction potential data of the treated stormwater and transmit it to the ORP monitor;

the ORP monitor is configured to receive and display the oxidation-reduction potential data and transmit it to the control module;

the pH electrode is configured to collect pH data of the treated stormwater and transmit it to the pH monitor;

the pH monitor is configured to receive and display the pH data and transmit it to the control module;

the electric ball valve is installed on the drainage pipe, and configured to receive and discharge the treated stormwater for a preset time period based on the first control signal.

According to some embodiments of the present disclosure, the stormwater and wastewater collection module comprises: a water inlet tank, a make-up water pipe, a float valve, an overflow tank, a water pipe check valve and an overflow port;

the water inlet tank is in communication with the drainage pipe and is configured to store the treated stormwater and supplementary wastewater;

the make-up water pipe is arranged at a preset height on one side of the water inlet tank, the make-up water pipe is in communication with the water inlet tank, and is configured to connect to a wastewater pipe network to introduce wastewater;

the float valve is arranged on the make-up water pipe, and configured to introduce wastewater through the make-up water pipe when the water amount of the water inlet tank is lower than the height of the make-up water pipe, and stop introducing wastewater when the water level reaches the height of the make-up water pipe;

the overflow tank is configured to store the treated stormwater that exceeds the capacity of the water inlet tank;

the water pipe check valve is lower than the height of the drainage pipe and is configured to communicate the water inlet tank with the overflow tank so that the treated stormwater exceeding the capacity of the water inlet tank flows into the overflow tank in one direction;

the overflow port is configured to discharge the treated stormwater exceeding the capacity of the overflow tank to the pipeline.

According to some embodiments of the present disclosure, the stormwater and wastewater collection module further comprises an air pipe one-way valve;

the air pipe one-way valve is configured to communicate the water inlet tank with the overflow tank, and configured to keep the pressure of the water inlet tank and the pressure of the overflow tank the same without generating negative pressure.

According to some embodiments of the present disclosure, the irrigation module comprises: a humidity sensor, a spray pump, a nozzle and a water delivery pipe;

the humidity sensor is configured to collect the soil moisture data of the planting area and transmit it to the control module;

the spray pump is configured to receive and pump out the stored water in the water inlet tank and the overflow tank based on the second control signal;

the nozzle is configured to spray the stored water;

one end of the water delivery pipe is in fluid communication with the spray pump, and the other end is in fluid communication with the water inlet tank and the overflow tank, so as to deliver the stored water in the water inlet tank and the overflow tank.

According to some embodiments of the present disclosure, it further comprises a hierarchical power supply control module;

the hierarchical power supply control module is configured to power the numerically controlled drainage module, the irrigation module and the control module, collect precipitation signals and transmit them to the control module, and preferentially power the numerically controlled drainage module based on a third control signal sent by the control module, or preferentially power the irrigation module based on a fourth control signal sent by the control module.

According to some embodiments of the present disclosure, the hierarchical power supply control module comprises: a solar controller, a solar panel, a battery pack and a rain and snow detector;

the solar controller is connected to the solar panel and the battery pack, and configured to detect voltage and current of the solar panel in real time, provide battery protection function to prevent overcharging, overdischarging and short circuit, receive the third control signal and control the battery pack to preferentially supply power to the numerically controlled drainage module according to the third control signal, and receive the fourth control signal and control the battery pack to preferentially supply power to the irrigation module according to the fourth control signal;

the solar panel is configured to convert solar energy into electrical energy;

the battery pack is configured to store the electrical energy and to supply power to the numerically controlled drainage module, the irrigation module and the control module;

the rain and snow detector is configured to detect precipitation signals and transmit them to the control module.

According to some embodiments of the present disclosure, the control module is further configured to receive and judge the precipitation signals, and send the third control signal or the fourth control signal according to a judgment result;

the control module comprises: a receiving unit, a dual-condition judgment unit, a humidity analysis unit, a precipitation monitoring unit and a sending unit;

the receiving unit is configured to receive the environmental data, the soil moisture data and the precipitation signals, and transmit them to the dual-condition judgment unit, the humidity analysis unit and the precipitation monitoring unit accordingly;

the dual-condition judgment unit is configured to judge whether a difference of the oxidation-reduction potential data at a preset time interval within a continuous preset number of times is less than a first threshold value, and if so, a first judgment standard is met, and after the first judgment standard is met, a total radiative forcing is calculated based on the oxidation-reduction potential data and the pH data, and when the total radiative forcing is less than a second threshold value, a second judgment standard is met, and the first control signal is sent to the sending unit;

the humidity analysis unit is configured to send the second control signal to the sending unit when the soil moisture data is less than a third threshold value;

the precipitation monitoring unit is configured to make a judgment based on the precipitation signals, and send the third control signal to the sending unit when in a precipitation state, and send the fourth control signal to the sending unit when in a dry state;

the sending unit is configured to receive and send the first control signal, the second control signal, the third control signal or the fourth control signal.

It can be seen from the above technical solutions that, compared with the prior art, the present disclosure discloses an intelligent low-carbon treatment and reuse system for stormwater and wastewater, which has the following beneficial effects:

1. The present disclosure collects relevant data in real time, calculates a reasonable drainage time, and discharges stormwater in time, thereby reducing carbon emissions while ensuring the denitrification effect.
2. The present disclosure monitors the degree of soil dryness/wetness. When the soil moisture is lower than a threshold, the treated stormwater and wastewater are reused for irrigation in the dry period, thereby ensuring the stability and efficiency of the system during continuous operation, avoiding the problem of plants and microorganisms facing growth restrictions and damaged activity when stormwater is discharged, which greatly affects the denitrification performance of the system during the next rainfall.
3. The present disclosure adds a preset amount of sawdust to the filler media layer to generate organic matter by degradation, it can provide a carbon source for microorganisms, domesticate and improve the types/species of flora in the bioretention system, and improve the denitrification efficiency of the system while increasing the operating cycle of the system.
4. The present disclosure improves the adaptive ability of the system in complex rainfall environments through an automated adjustment mechanism, effectively enhances operational efficiency and stability, and thereby achieves effective utilization of solar energy resources.
5. The system of the present disclosure realizes the efficient treatment of nutrients in runoff stormwater through optimized design and intelligent control, and reduces the carbon pollution caused by greenhouse gas emissions during the treatment process. While efficiently reusing stormwater and wastewater and utilizing resources, it extends the engineering service life of the bioretention system.

BRIEF DESCRIPTION OF THE DRAWINGS

In order to more clearly illustrate the embodiments of the present disclosure or the technical solutions in the prior art, the drawings required for use in the embodiments or the description of the prior art will be briefly introduced below. Obviously, the drawings described below are only embodiments of the present disclosure. For ordinary technicians in this field, other drawings can be obtained based on the provided drawings without paying creative work.

Numeral reference: 1—planting layer, 2—filler media layer, 3—drainage layer, 4—drainage pipe, 5—submerged zone, 6—outlet pipe, 7—ORP electrode, 8—ORP monitor, 9—pH electrode, 10—pH monitor, 11—electric ball valve, 12—control module, 13—water inlet tank, 14—make-up water pipe, 15—float valve, 16—overflow tank, 17—water pipe check valve, 18—overflow port, 19—air pipe one-way valve, 20—humidity sensor, 21—spray pump, 22—nozzle, 23—water delivery pipe, 24—solar controller, 25—solar panel, 26—battery pack, 27—rain and snow detector.

DETAILED DESCRIPTION OF EMBODIMENTS

Next, the technical solutions in the embodiments of the present disclosure will be clearly and completely described with reference to the drawings in the embodiments of the present disclosure. Obviously, the described embodiments are only part of the present disclosure, not all of them. Based on the embodiments of the present disclosure, all other embodiments obtained by ordinary technicians in this field without creative work are within the scope of protection of the present disclosure.

Embodiment 1

Figure 1:
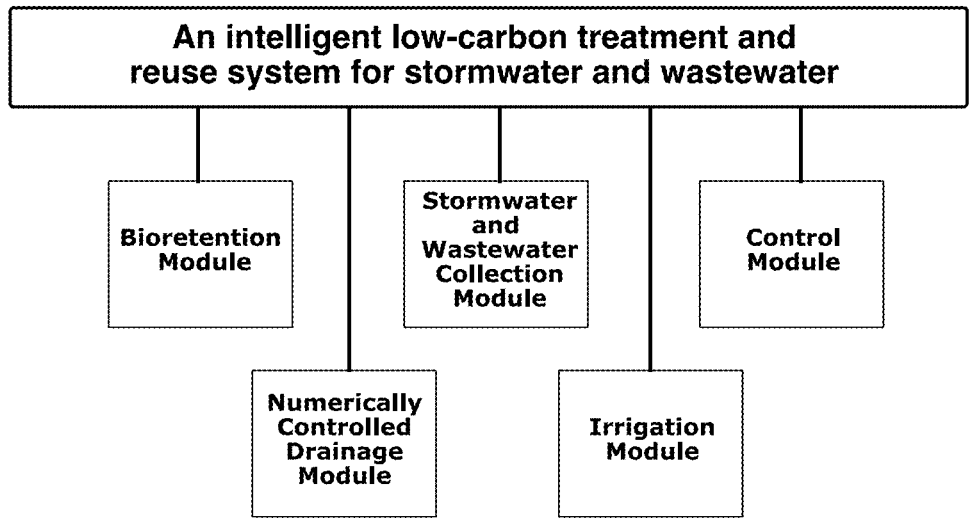
FIG. 1 is a schematic structural view of an intelligent low-carbon treatment and reuse system for stormwater and wastewater provided by the present disclosure.

As shown in FIG. 1, an embodiment of the present disclosure discloses an intelligent low-carbon treatment and reuse system for stormwater and wastewater, including: a bioretention module, a numerically controlled drainage module, a stormwater and wastewater collection module, an irrigation module, and a control module;
the bioretention module is configured to collect stormwater, improve species of bacterial flora, and treat the stormwater to obtain treated stormwater;
the numerically controlled drainage module is configured to collect oxidation-reduction potential data and pH data of the treated stormwater and transmit them to the control module as environmental data, and discharge the treated stormwater for a preset time period based on a first control signal sent by the control module;
the stormwater and wastewater collection module is configured to store the discharged treated stormwater and maintain water storage volume within a preset range;
the irrigation module is configured to collect soil moisture data of the bioretention module and transmit it to the control module, and extract the stored water in the stormwater and wastewater collection module to irrigate the bioretention module based on a second control signal sent by the control module;
the control module is configured to receive the environmental data and perform a dual-condition judgment, send the first control signal when a preset condition is met, receive the soil moisture data, and send the second control signal when a set condition is met.

Embodiment 2

Figure 2:
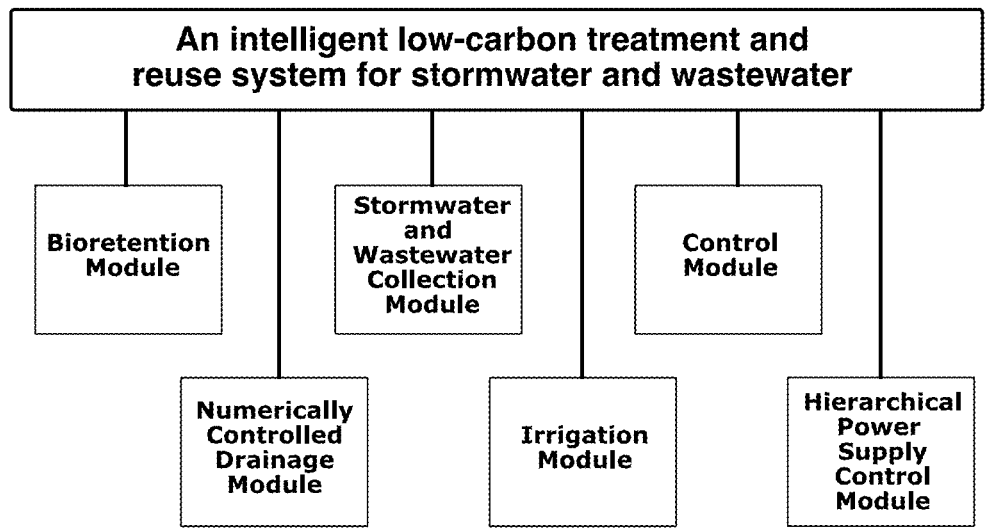
FIG. 2 is a schematic structural view of an intelligent low-carbon treatment and reuse system for stormwater and wastewater provided in a second embodiment of the present disclosure.
Figure 3:
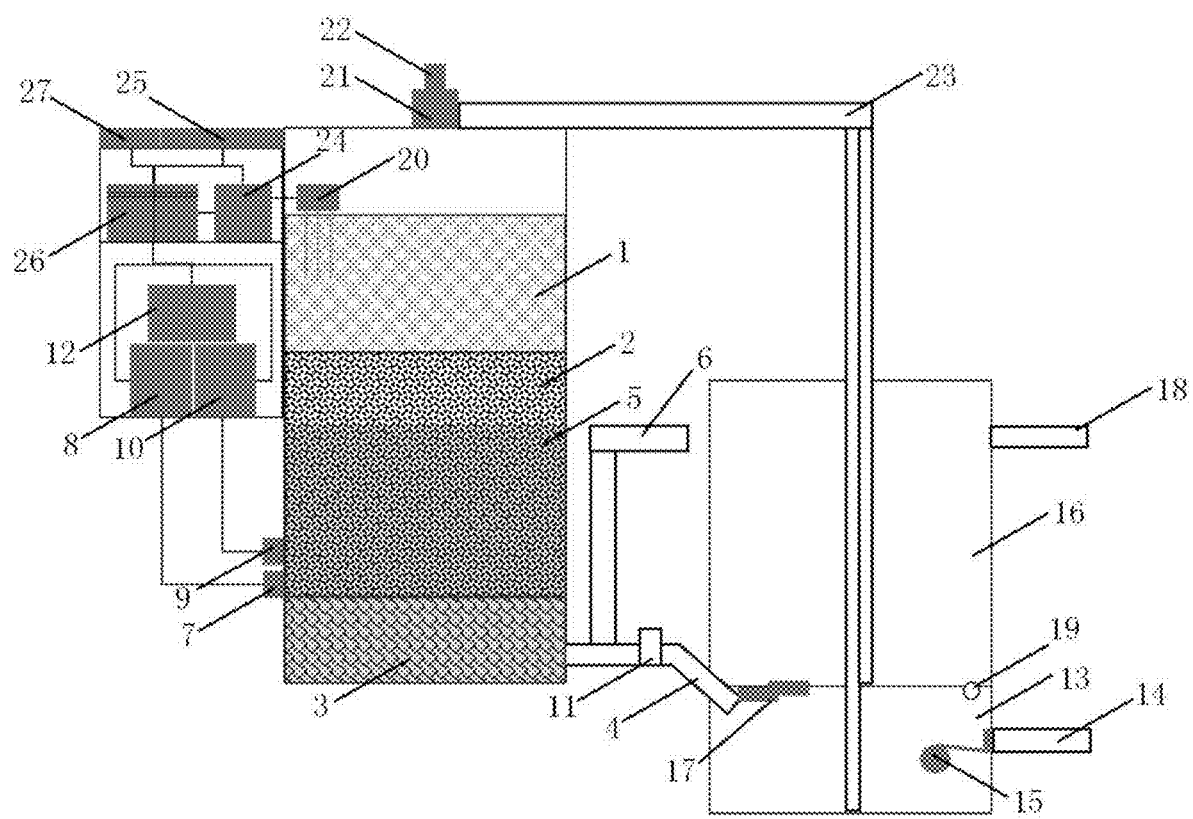
FIG. 3 is a structural plan view of an intelligent low-carbon treatment and reuse system for stormwater and wastewater provided in the second embodiment of the present disclosure.

As shown in FIG. 2-FIG. 3, an embodiment of the present disclosure discloses an intelligent low-carbon treatment and reuse system for stormwater and wastewater, including: a bioretention module, a numerically controlled drainage module, a stormwater and wastewater collection module, an irrigation module and a control module.

The bioretention module is configured to collect stormwater, improve species of bacterial flora, and treat the stormwater to obtain treated stormwater:
Preferably, the bioretention module comprises: a planting layer 1, a filler media layer 2, a drainage layer 3 and a drainage pipe 4;
The planting layer 1, composed of soil and plants, is configured to collect and filter stormwater. It removes pollutants such as suspended solids and heavy metals through the physical filtration of the soil, slows down the runoff of stormwater, and the plants absorb inorganic nitrogen through assimilation, and nitrification reaction is carried out by microorganisms, effectively purifying water quality;

The filler media layer 2 has a predetermined amount of plant-based carbon source (such as sawdust, straw) built therein, it is configured to provide carbon source for microorganisms, improve the species of bacterial flora, and further perform a denitrification reaction on stormwater to obtain the treated stormwater;

The drainage layer 3 is configured to support the planting layer 1 and the filler media layer 2 and facilitate the drainage of the treated stormwater to a pipeline;

The drainage pipe 4 is in communication with the drainage layer 3 and is configured for the drainage of the treated stormwater.

Preferably, in this embodiment, the filler media layer 2 contains 10% sawdust, and the organic matter produced by degradation can provide a carbon source for microorganisms, domesticate and improve the types of bacterial flora in the bioretention system, and improve the system's denitrification efficiency while increasing the system's operating cycle.

Preferably, the filler media layer 2 can effectively improve the purification effect of stormwater by selecting suitable filling materials (such as gravel, sand, etc.) to remove pollutants such as suspended matter and organic matter therein.

Preferably, the drainage layer 3 can quickly drain excess water from the soil of the planting layer 1 to avoid problems such as plant root rot and soil compaction caused by water accumulation. By draining water in time, the drainage layer helps to maintain the air permeability and looseness of the soil, which is beneficial to the growth of plant roots and the activity of soil microorganisms.

Preferably, the filler media layer 2 and the drainage layer 3 together constitute a submerged zone 5. The existence of the submerged zone 5 promotes the flow of air when the runoff enters the system, thereby helping to form the coexistence of aerobic, anaerobic and anaerobic environments, improving the denitrification capacity, and significantly enhancing the removal effect of the bioretention pond on nitrate nitrogen; the submerged zone 5 can provide the necessary moisture for vegetation during drought periods, which helps to maintain the vegetation growth and landscape effect in the bioretention pond.

Preferably, the bioretention module further comprises an outlet pipe 6;

The outlet pipe 6 is in communication with the drainage pipe 4 and is configured to discharge excess stormwater to a sewer pipeline when the amount of stormwater is greater than a set value.

The numerically controlled drainage module is configured to collect the oxidation-reduction (redox) potential data and pH data of the treated stormwater and transmit them to the control module as environmental data, and discharge the treated stormwater for a preset time period based on a first control signal sent by the control module:

Preferably, the numerically controlled drainage module comprises: an ORP electrode 7, an ORP monitor 8, a pH electrode 9, a pH monitor 10 and an electric ball valve 11;

The ORP electrode 7 is configured to collect oxidation-reduction potential data of the treated stormwater and transmit it to the ORP monitor 8;

The ORP monitor 8 is configured to receive and display the oxidation-reduction potential data and transmit it to the control module 12;

The pH electrode 9 is configured to collect pH data of the treated stormwater and transmit it to the pH monitor 10;

The pH monitor 10 is configured to receive and display the pH data and transmit it to the control module 12;

The electric ball valve 11 is installed on the drainage pipe 4, and configured to receive and discharge the treated stormwater for a preset time period based on the first control signal.

Preferably, after several experiments, it was found that the water stored in the submerged zones of bioretention systems of different specifications can basically be discharged within 10 minutes. Therefore, in this embodiment, the preset time period is set to 10 minutes, that is, the electric ball valve 11 is automatically closed after being opened for 10 minutes, ensuring that the bioretention system recovers to a state where a submerged zone can be generated to cope with the runoff stormwater treatment during the next rainfall, thereby realizing the automation of the entire control process.

Preferably, the ORP electrode 7 and the pH electrode 9 are arranged in the submerged zone 4 to collect corresponding data of the treated stormwater.

Preferably, the control module 12 fits the relationship between the oxidation-reduction potential (ORP), pH and greenhouse gas (GHG) concentration by collecting environmental data for a long time, and sets a dual-condition judgment procedure in combination with the denitrification "knee point". If the control module 12 judges that the ORP value satisfies the preset ranges corresponding to the GHG and nitrogen concentrations at the same time, then the control module 12 immediately sends a first control signal to start the electric ball valve 11, drains water according to the preset time period and then resets. This is the ideal drainage time for carbon-nitrogen balance with good water quality treatment effect and low greenhouse effect caused by greenhouse gas emissions.

The stormwater and wastewater collection module is configured to store the discharged treated stormwater, replenish wastewater when the stormwater is insufficient, and maintain the water storage volume within the preset range:

Preferably, the stormwater and wastewater collection module comprises: a water inlet tank 13, a make-up water pipe 14, a float valve 15, an overflow tank 16, a water pipe check valve 17 and an overflow port 18;

The water inlet tank 13 is in communication with the drainage pipe 4 and is configured to store the treated stormwater and supplementary wastewater. The discharged treated stormwater can enter the water inlet tank 13 without external pressure due to the height difference. No matter how much treated stormwater is discharged from the drainage pipe 4, it can flow into the water inlet tank 13 without the need for a pump;

The make-up water pipe 14 is arranged at a preset height on one side of the water inlet tank 13, is communicated with the water inlet tank 13, and is configured to connect to a wastewater pipe network to introduce wastewater;

The float valve 15 is arranged on the make-up water pipe 14, and configured to introduce wastewater through the make-up water pipe 14 when the water amount/level in the water inlet tank 13 is lower than the height of the make-up water pipe 14, and stop introducing wastewater when the water level reaches the height of the make-up water pipe 14, so as to ensure that there is water in the water inlet tank 13 continuously;

The overflow tank 16 is configured for storing the treated stormwater that exceeds the capacity of the water inlet tank 13;

The water pipe check valve 17 is lower than the height of the drainage pipe 4 and is configured to communicate the water inlet tank 13 with the overflow tank 16 so that the treated stormwater exceeding the capacity of the water inlet tank 13 flows into the overflow tank 16 in one direction;

The overflow port 18 is configured to discharge the treated stormwater exceeding the capacity of the overflow tank 16 to the sewer pipeline.

Preferably, the stormwater and wastewater collection module further comprises an air pipe one-way valve 19;

The air pipe one-way valve 19 is configured to communicate the water inlet tank 13 with the overflow tank 16, and configured to keep the pressure of the water inlet tank 13 the same as the pressure of the overflow tank 16, without generating negative pressure, to ensure that excess stormwater can flow out smoothly from the water pipe check valve 17.

Preferably, when the height of the treated stormwater stored in the water inlet tank 13 exceeds the drainage pipe 4, the stormwater cannot be discharged smoothly, so an overflow tank 16 is added above the water inlet tank 13, and the water inlet tank 13 and the overflow tank 16 are communicated with each other through the water pipe check valve 17 and the air pipe one-way valve 19.

The irrigation module is configured to collect soil moisture data of the bioretention module and transmit it to the control module, extract the stored water in the stormwater and wastewater collection module to irrigate the bioretention module based on a second control signal sent by the control module, and perform secondary treatment on the mixed stormwater and wastewater;

Preferably, the irrigation module includes: a humidity sensor 20, a spray pump 21, a nozzle 22 and a water delivery pipe 23;

The humidity sensor 20 is configured to collect soil moisture data of the planting area 1 and transmit it to the control module 12;

The spray pump 21 is configured to receive and pump out the stored water in the water inlet tank 13 and the overflow tank 16 based on the second control signal;

The nozzle 22 is configured to spray the stored water, and the whole system performs secondary treatment on the sprayed mixed stormwater and wastewater;

One end of the water delivery pipe 23 is in fluid communication with the spray pump 21, and the other end is in fluid communication with the water inlet tank 13 and the overflow tank 16, so as to deliver the water stored in the water inlet tank 13 and the overflow tank 16.

Preferably, it also includes: a hierarchical power supply control module;

The hierarchical power supply control module is configured to power the numerically controlled drainage module, the irrigation module and the control module 12, collect the precipitation signal and transmit it to the control module 12, and give priority to powering the numerically controlled drainage module based on a third control signal sent by the control module 12, or give priority to powering the irrigation module based on a fourth control signal sent by the control module.

Preferably, the hierarchical power supply control module includes: a solar controller 24, a solar panel 25, a battery pack 26 and a rain and snow detector 27;

The solar controller 24 is connected to the solar panel 25 and the battery pack 26, and configured to detect the voltage and current of the solar panel 25 in real time, provide a battery protection function to prevent overcharging, overdischarging and short circuit, receive the third control signal and control the battery pack 26 to preferentially supply power to the numerically controlled drainage module according to the third control signal, and receive the fourth control signal and control the battery pack 26 to preferentially supply power to the irrigation module according to the fourth control signal;

The solar panel 25 is configured to convert solar energy into electrical energy;

The battery pack 26 is configured to store electrical energy and to supply power to the numerically controlled drainage module, the irrigation module and the control module 12;

The rain and snow detector 27 is configured to detect precipitation signals and transmit them to the control module 12.

Preferably, the system of the present disclosure adopts solar power supply, saves energy, and adopts an intelligent classification mode, with a rain and snow detector, which monitors the environmental status in real time to control the power supply. When it rains or snows, the electric energy stored in the battery pack 26 is preferentially supplied to the numerically controlled drainage module, so that the bioretention system can accurately control the whole process of stormwater denitrification and carbon reduction, and the remaining energy can be allocated to other modules; when it is dry for a long time, the electric energy stored in the battery pack 26 is preferentially supplied to the irrigation module, and the system is accurately irrigated to ensure the good growth of microorganisms and plants therein. The adaptive ability of the system in a complex rainfall environment is improved through an automated adjustment mechanism, and the operation efficiency and stability are effectively enhanced, thereby realizing the effective use of solar energy resources.

The control module is configured to receive environmental data and perform a dual-condition judgment, send the first control signal when a preset condition is met, receive soil moisture data, and send the second control signal when a set condition is met.

Figure 4:
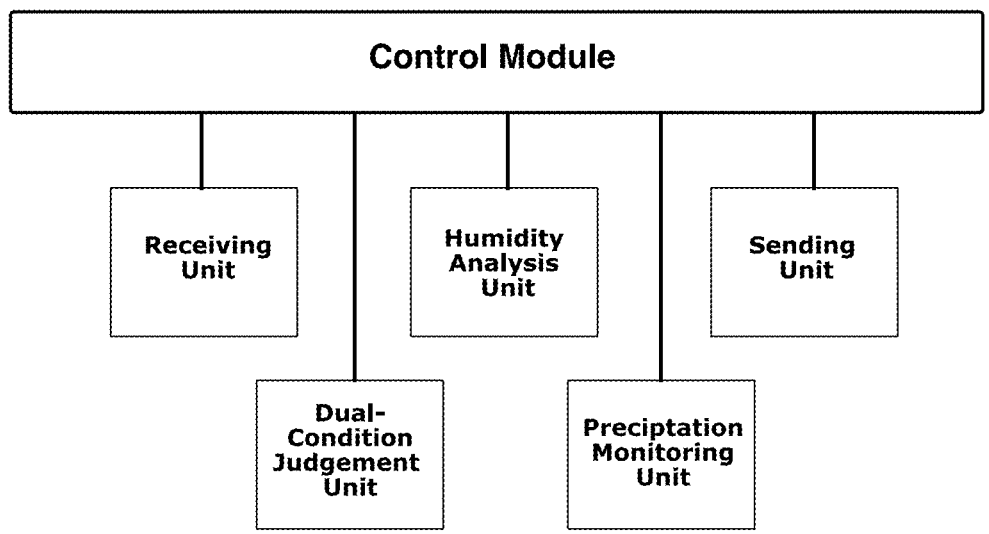
FIG. 4 is a schematic structural view of the control module provided in the second embodiment of the present disclosure.

Preferably, the control module is further configured to receive and judge the precipitation signals, and send the third control signal or the fourth control signal according to the judgment result;

As shown in FIG. 4, the control module includes: a receiving unit, a dual-condition judgment unit, a humidity analysis unit, a precipitation monitoring unit and a sending unit;

The receiving unit is configured to receive environmental data, soil moisture data and precipitation signals, and transmit them to the dual-condition judgment unit, the humidity analysis unit and the precipitation monitoring unit accordingly;

The dual-condition judgment unit is configured to judge whether the difference of the oxidation-reduction (redox) potential data at a preset time interval within a continuous preset number of times is less than a first threshold value, and if it is satisfied, it meets the first judgment standard, and after meeting the first judgment standard, the total radiative forcing is calculated based on the oxidation-reduction potential data and the pH data, and when the total radiative forcing is less than a second threshold value, the second judgment standard is met, and the first control signal is sent to the sending unit;

The humidity analysis unit is configured to send the second control signal to the sending unit when the soil moisture data is less than a third threshold value;

The precipitation monitoring unit is configured to make a judgment based on the precipitation signals, and send the third control signal to the sending unit when in a precipitation state, and send the fourth control signal to the sending unit when in a dry state;

The sending unit is configured to receive and send the first control signal, the second control signal, the third control signal or the fourth control signal.

Preferably, the dual-condition judgment unit performs a dual-condition judgment, including:

The first judgment: control of denitrification effect.

Through long-term monitoring of the ORP data in the system, it is found that the ORP value shows a regular change trend within a few hours after the stormwater enters the system: it first decreases slowly, then decreases rapidly in a certain period of time, and then tends to be flat. Studies have confirmed that the stage of rapid decline in ORP value is the stage at which the denitrification reaction ends. The bioretention system removes nitrate nitrogen from stormwater mainly through denitrification. Therefore, the denitrification process inside the system can be judged by the change in ORP value.

Figure 5:
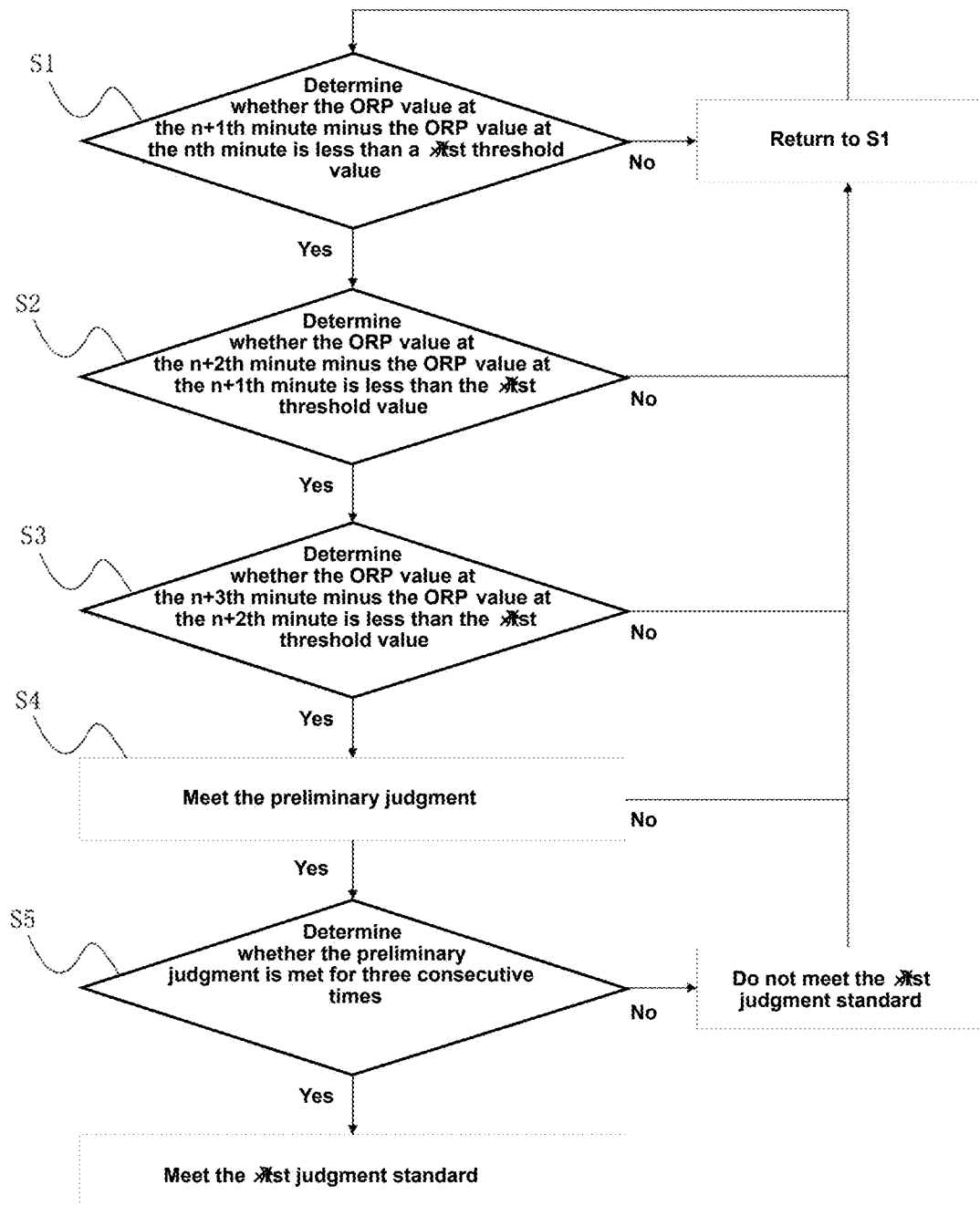
FIG. 5 is a flow chart of the first judgment method provided in the second embodiment of the present disclosure.

In this embodiment, the ORP monitor 8 collects the oxidation-reduction potential data (ORP data) in the system every 1 minute, and sets a judgment condition, as shown in FIG. 5. The first judgment process is as follows:

S1: determine whether the ORP value at the n+1th minute minus the ORP value at the nth minute is less than a first threshold value;

S2: If yes, determine whether the ORP value at the n+2th minute minus the ORP value at the n+1th minute is less than the first threshold value. If not, return to S1.

S3: If yes, determine whether the ORP value at the n+3th minute minus the ORP value at the n+2th minute is less than the first threshold value. If not, return to S1.

S4: If yes, meet the preliminary judgment; if no, return to S1.

S5: determine whether the preliminary judgment is met for three consecutive times. If so, it meets the first judgment standard. Otherwise, it does not meet the first judgment standard and returns to S1.

The second judgment: control of greenhouse gases.

Through long-term experimental data collection, it was found that there is a strong correlation between ORP, pH and the radiative forcing value caused by greenhouse gases. Therefore, a regression analysis was performed to obtain the relationship formula between ORP, pH and radiative forcing:

$$Y = aX_1 + bX_2 + c,$$

Where Y represents the total radiative forcing, $X_1$ represents the ORP value, $X_2$ represents the pH value, a represents the $X_1$ coefficient, b represents the $X_2$ coefficient, and c represents a constant term.

The ORP monitor 8 and the pH monitor 10 collect the oxidation-reduction potential data (ORP data) and the pH data in the system every 1 minute, and set the judgment program. The second judgment process is as follows:

S1: determine whether Y is less than a second threshold value after substituting the ORP data and pH data of the nth minute into the formula $Y=aX_1+bX_2+c$;

S2: If yes, it meets the second judgment standard; if not, it returns to S1.

Preferably, when the ORP data and pH data at a certain moment simultaneously meet the judgment thresholds of the denitrification control and greenhouse gas radiation forcing setting conditions, it is in compliance with the dual-condition judgment. At this time, it is the ideal drainage time for carbon-nitrogen balance with good water quality treatment effect and low greenhouse effect caused by greenhouse gas emissions.

Preferably, in this embodiment, the first threshold value is set to −1.6, and the second threshold value is set to 55.84.

Preferably, the precipitation monitoring unit is configured to make judgments based on the precipitation signals. When in a precipitation state, the third control signal is sent to the sending unit, and the numerically controlled drainage module is preferentially powered by the third control signal; when in a dry state, the fourth control signal is sent to the sending unit, and the irrigation module is preferentially powered by the fourth control signal.

It can be seen from the above technical solutions that, compared with the prior art, the present disclosure discloses an intelligent low-carbon treatment and reuse system for stormwater and wastewater, which has the following beneficial effects:

1. The present disclosure collects relevant data in real time, calculates a reasonable drainage time, and discharges stormwater in time, thereby reducing carbon emissions while ensuring the denitrification effect.

2. The present disclosure monitors the degree of soil dryness/wetness. When the soil moisture is lower than a threshold, the treated stormwater and wastewater are reused for irrigation in the dry period, thereby ensuring the stability and efficiency of the system during continuous operation, avoiding the problem of plants and microorganisms facing growth restrictions and damaged activity when stormwater is discharged, which greatly affects the denitrification performance of the system during the next rainfall.

3. The present disclosure adds a preset amount of sawdust to the filler media layer to generate organic matter by degradation, it can provide a carbon source for microorganisms, domesticate and improve the types/species of flora in the bioretention system, and improve the denitrification efficiency of the system while increasing the operating cycle of the system.

4. The present disclosure improves the adaptive ability of the system in complex rainfall environments through an automated adjustment mechanism, effectively enhances operational efficiency and stability, and thereby achieves effective utilization of solar energy resources.

5. The system of the present disclosure realizes the efficient treatment of nutrients in runoff stormwater through optimized design and intelligent control, and reduces the carbon pollution caused by greenhouse gas emissions during the treatment process. While efficiently reusing stormwater and wastewater and utilizing resources, it extends the engineering service life of the bioretention system.

In this specification, each embodiment is described in a progressive manner, and each embodiment focuses on the differences from other embodiments. The same or similar parts between the embodiments can be referred to each other. For the devices disclosed in the embodiments, since they correspond to the methods disclosed in the embodiments, the description is relatively simple, and the relevant parts can be referred to the method part.

The above description of the disclosed embodiments enables one skilled in the art to implement or use the present disclosure. Various modifications to these embodiments will be apparent to one skilled in the art, and the general principles defined herein may be implemented in other embodiments without departing from the spirit or scope of the present disclosure. Therefore, the present disclosure will not be limited to the embodiments shown herein, but rather to the widest scope consistent with the principles and novel features disclosed herein.

What is claimed is:

1. An intelligent low-carbon treatment and reuse system for stormwater and wastewater, comprising: a bioretention module, a numerically controlled drainage module, a stormwater and wastewater collection module, an irrigation module and a control module;
    wherein the bioretention module is configured to collect stormwater, improve species of bacterial flora, and treat the stormwater to obtain treated stormwater;
    the numerically controlled drainage module is configured to collect oxidation-reduction potential (ORP) data and pH data of the treated stormwater and transmit them to the control module as environmental data, and discharge the treated stormwater for a preset time period based on a first control signal sent by the control module;
    the stormwater and wastewater collection module is configured to store the discharged treated stormwater and maintain water storage volume within a preset range;
    the stormwater and wastewater collection module comprises: a water inlet tank, a make-up water pipe, a float valve, an overflow tank, a water pipe check valve and an overflow port;
    the make-up water pipe is arranged at a preset height on one side of the water inlet tank, the make-up water pipe is in communication with the water inlet tank, and is configured to connect to a wastewater pipe network to introduce wastewater;
    the float valve is arranged on the make-up water pipe, and configured to introduce wastewater through the make-up water pipe when the water amount of the water inlet tank is lower than the height of the make-up water pipe, and stop introducing wastewater when the water level reaches the height of the make-up water pipe;
    the irrigation module is configured to collect soil moisture data of the bioretention module and transmit it to the control module, and extract the stored water in the stormwater and wastewater collection module to irrigate the bioretention module based on a second control signal sent by the control module;
    the control module is configured to receive the environmental data and perform a dual-condition judgment, send the first control signal when a first preset condition is met, receive the soil moisture data, and send the second control signal when a second preset condition is met;
    the system further comprises a hierarchical power supply control module;
    the hierarchical power supply control module is configured to power the numerically controlled drainage module, the irrigation module and the control module, collect precipitation signals and transmit them to the control module, and preferentially power the numerically controlled drainage module based on a third control signal sent by the control module, or preferentially power the irrigation module based on a fourth control signal sent by the control module;
    the control module is further configured to receive and judge the precipitation signals, and send the third control signal or the fourth control signal according to a judgment result;
    the control module comprises a dual-condition judgment unit, a precipitation monitoring unit, a receiving unit, a humidity analysis unit, and a sending unit;
    the dual-condition judgment unit is configured to evaluate the first preset condition and generate the first control signal by making a judgement whether a difference of the ORP data at a preset time interval within a continuous preset number of times is less than a first threshold value, and if so, a first judgment standard is met, and after the first judgment standard is met, a total radiative forcing is calculated based on the ORP data and the pH data, and when the total radiative forcing is less than a second threshold value, a second judgment standard is met, and the first control signal is sent to the sending unit;
    the precipitation monitoring unit is configured to make a judgment based on the precipitation signals, and send the third control signal to the sending unit when in a precipitation state, and send the fourth control signal to the sending unit when in a dry state;
    the receiving unit is configured to receive the environmental data, the soil moisture data and the precipitation signals, and transmit them to the dual-condition judgment unit, the humidity analysis unit and the precipitation monitoring unit accordingly;
    the humidity analysis unit is configured to evaluate the second preset condition and generate the second control signal by sending the second control signal to the sending unit when the soil moisture data is less than a third threshold value;
    the sending unit is configured to receive and send the first control signal, the second control signal, the third control signal or the fourth control signal.

2. The system according to claim 1, wherein the bioretention module comprises: a planting layer, a filler media layer, a drainage layer and a drainage pipe;
    the planting layer is configured to collect and filter stormwater, slow down a speed of stormwater runoff, and perform nitrification reaction;
    the filler media layer has a predetermined amount of plant-based carbon source therein, the filler media layer is configured to provide a carbon source for microorganisms, improve the species of bacterial flora, and perform a denitrification reaction on stormwater to obtain the treated stormwater;
    the drainage layer is configured to support the planting layer and the filler media layer and facilitate the drainage of the treated stormwater to a pipeline;
    the drainage pipe is in communication with the drainage layer and is configured for the drainage of the treated stormwater.

3. The system according to claim 2, wherein the bioretention module further comprises an outlet pipe;

the outlet pipe is in communication with the drainage pipe and is configured for discharging excess stormwater when the amount of stormwater is greater than a set value.

4. The system according to claim 2, wherein the numerically controlled drainage module comprises: an ORP electrode, an ORP monitor, a pH electrode, a pH monitor and an electric ball valve;

the ORP electrode is configured to collect the ORP data of the treated stormwater and transmit it to the ORP monitor;

the ORP monitor is configured to receive and display the ORP data and transmit it to the control module;

the pH electrode is configured to collect pH data of the treated stormwater and transmit it to the pH monitor;

the pH monitor is configured to receive and display the pH data and transmit it to the control module;

the electric ball valve is installed on the drainage pipe, and configured to receive and discharge the treated stormwater for a preset time period based on the first control signal.

5. The system according to claim 2, wherein the water inlet tank is in communication with the drainage pipe and is configured to store the treated stormwater and supplementary wastewater;

the overflow tank is configured to store the treated stormwater that exceeds the capacity of the water inlet tank;

the water pipe check valve is lower than the height of the drainage pipe and is configured to communicate the water inlet tank with the overflow tank so that the treated stormwater exceeding the capacity of the water inlet tank flows into the overflow tank in one direction;

the overflow port is configured to discharge the treated stormwater exceeding the capacity of the overflow tank to the pipeline.

6. The system according to claim 5, wherein the stormwater and wastewater collection module further comprises an air pipe one-way valve;

the air pipe one-way valve is configured to communicate the water inlet tank with the overflow tank, and configured to keep the pressure of the water inlet tank and the pressure of the overflow tank the same without generating negative pressure.

7. The system according to claim 5, wherein the irrigation module comprises: a humidity sensor, a spray pump, a nozzle and a water delivery pipe;

the humidity sensor is configured to collect the soil moisture data of the planting layer and transmit it to the control module;

the spray pump is configured to receive and pump out the stored water in the water inlet tank and the overflow tank based on the second control signal;

the nozzle is configured to spray the stored water;

one end of the water delivery pipe is in fluid communication with the spray pump, and the other end is in fluid communication with the water inlet tank and the overflow tank, so as to deliver the stored water in the water inlet tank and the overflow tank.

8. The system according to claim 1, wherein the hierarchical power supply control module comprises: a solar controller, a solar panel, a battery pack and a rain and snow detector;

the solar controller is connected to the solar panel and the battery pack, and configured to detect voltage and current of the solar panel in real time, provide battery protection function to prevent overcharging, overdischarging and short circuit, receive the third control signal and control the battery pack to preferentially supply power to the numerically controlled drainage module according to the third control signal, and receive the fourth control signal and control the battery pack to preferentially supply power to the irrigation module according to the fourth control signal;

the solar panel is configured to convert solar energy into electrical energy;

the battery pack is configured to store the electrical energy and to supply power to the numerically controlled drainage module, the irrigation module and the control module;

the rain and snow detector is configured to detect the precipitation signals and transmit them to the control module.

* * * * *